(12) United States Patent  
Grossnickle (10) Patent No.: US 11,817,713 B2
(45) Date of Patent: Nov. 14, 2023

(54) METHOD OF RAPID CONVERSION OF CHEMICAL ENERGY INTO USABLE ELECTRICAL ENERGY

(71) Applicant: The Boeing Company, Chicago, IL (US)

(72) Inventor: James A Grossnickle, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 446 days.

(21) Appl. No.: 16/825,045

(22) Filed: Mar. 20, 2020

(65) Prior Publication Data

US 2021/0296929 A1 Sep. 23, 2021

(51) Int. Cl.
*F41A 21/32* (2006.01)
*F41J 13/00* (2009.01)
*H02J 50/00* (2016.01)
*H02J 50/10* (2016.01)
*F41B 6/00* (2006.01)

(52) U.S. Cl.
CPC ............ *H02J 50/001* (2020.01); *F41A 21/32* (2013.01); *F41B 6/003* (2013.01); *H02J 50/10* (2016.02)

(58) Field of Classification Search
None
See application file for complete search history.

(56) References Cited

U.S. PATENT DOCUMENTS

| 4,714,003 | A | * | 12/1987 | Kemeny | F41B 6/006 89/8 |
| 4,753,153 | A | * | 6/1988 | Jasper, Jr. | F41B 6/006 318/135 |
| 4,840,107 | A | | 6/1989 | Weldon | |
| 4,966,884 | A | * | 10/1990 | Hilal | F41B 6/00 89/8 |
| 5,024,137 | A | * | 6/1991 | Schroeder | F42B 6/006 89/8 |
| 5,168,118 | A | * | 12/1992 | Schroeder | F41B 6/00 318/135 |

(Continued)

OTHER PUBLICATIONS

European Examination Report dated Jul. 18, 2022 for European Patent Application No. 2162690.8.

(Continued)

*Primary Examiner* — Derrick R Morgan
(74) *Attorney, Agent, or Firm* — GATES & COOPER LLP (57) ABSTRACT

A system using Faraday's law to rapidly direct convert the kinetic energy of a magnetized and/or conducting projectile into usable electrical energy. The system includes a barrel comprising a bore; a circuit including a plurality of electrically conductive components distributed along a length of the bore; and a projectile comprising at least one of a conductive material or a magnetic material magnetically coupled to the electrically conductive components when the projectile is moving along the length of the bore. The circuit stores energy generated from an electric current induced in the electrically conductive components when the projectile moving along the length of the bore causes a magnetic interaction between the electrically conductive components and the magnetic material or the conductive material. The magnetic interaction also causes braking of the projectile.

20 Claims, 6 Drawing Sheets

(56) References Cited

U.S. PATENT DOCUMENTS

| | | | | |
|---|---|---|---|---|
| 5,217,948 A * | 6/1993 | Leung | | F42B 6/006 102/440 |
| 6,361,393 B1 * | 3/2002 | Seymour | | F41B 6/00 446/34 |
| 7,111,619 B2 * | 9/2006 | Schneider | | F41B 6/003 124/8 |
| 9,476,668 B1 * | 10/2016 | Grace | | F41A 1/02 |
| 9,562,736 B2 * | 2/2017 | Grossnickle | | F41B 6/003 |
| 9,784,523 B2 * | 10/2017 | Grace | | F41B 6/003 |
| 10,041,757 B2 | 8/2018 | Grossnickle et al. | | |
| 10,181,779 B2 * | 1/2019 | Matsui | | H02K 41/02 |
| 10,677,559 B2 * | 6/2020 | Davies | | F42B 35/00 |
| 2008/0006144 A1 * | 1/2008 | Gaigler | | F41B 6/003 89/8 |
| 2008/0277939 A1 * | 11/2008 | Richardson | | B60G 9/003 320/137 |
| 2009/0108589 A1 * | 4/2009 | Racho | | H02K 7/1876 290/1 R |
| 2009/0302982 A1 * | 12/2009 | Putman | | F41B 6/00 335/216 |
| 2010/0031552 A1 * | 2/2010 | Houde-Walter | | F41C 23/16 42/72 |
| 2010/0300274 A1 * | 12/2010 | Root, Jr. | | F42B 6/006 89/1.8 |
| 2015/0008867 A1 * | 1/2015 | Smychkovich | | H02J 7/00 320/137 |
| 2016/0245613 A1 * | 8/2016 | Grossnickle | | F41A 31/00 |
| 2016/0341514 A1 * | 11/2016 | Grace | | H02K 7/025 |
| 2016/0372999 A1 * | 12/2016 | Matsui | | F41F 3/10 |
| 2017/0237329 A1 * | 8/2017 | Chen | | H02K 41/0352 310/12.07 |
| 2020/0080814 A1 * | 3/2020 | Davies | | F41B 6/006 |
| 2021/0183555 A1 * | 6/2021 | Hartman | | H02K 7/09 |

OTHER PUBLICATIONS

Extended European Search Report dated Jul. 30, 2021 for EP Application No. 21162690.8.

* cited by examiner

METHOD OF RAPID CONVERSION OF CHEMICAL ENERGY INTO USABLE ELECTRICAL ENERGY

BACKGROUND

1. Field

The present disclosure relates to methods and system of converting chemical or kinetic energy into usable electrical energy.

2. Description of the Related Art

Charging appliances while in remote field locations can be challenging. Existing solutions generally involve carrying multiple charged replacement batteries. However, batteries are heavy, have relatively low energy density, and slowly lose energy (thereby requiring frequent recharging which may not always be possible. What is needed is a more convenient, lightweight, and higher energy density method of storing energy while in the field. Embodiments described herein satisfy this need.

Summary

The present disclosure describes a regenerative braking system for converting kinetic energy of a projectile into electrical energy suitable for powering appliances or charging a battery. The regenerative braking system can be embodied in many ways including, but not limited to, the following.

1. A regenerative braking system, comprising:
   a barrel including a bore;
   a circuit including a plurality of electrically conductive components distributed along a length of the bore; and
   a projectile comprising at least one of a conductive material or a magnetic material magnetically coupled to the electrically conductive components when the projectile is moving along the length of the bore. The circuit stores energy generated from an electric current induced in the electrically conductive components when the projectile moving along the length of the bore causes a magnetic interaction between the electrically conductive components and the at least one of the magnetic material or the conductive material. The magnetic interaction further causes braking of the projectile.

2. The system of example 1, wherein:
   the projectile generates a first magnetic field configured to induce the electric current in the electrically conductive components when the projectile is moving along the length of the bore, and
   the electric current generates a second magnetic field and the electrically conductive components are configured so that the magnetic interaction of the second magnetic field with the first magnetic field causes the braking of the projectile.

3. The system of example 1, wherein the magnetic interaction induces an eddy current in the conductive material in the projectile moving along the length of the bore.

4. The system of any of the examples 1-3, further comprising a connector configured to attach the barrel to a muzzle of a firearm, wherein the projectile comprises a bullet fired into the barrel from the muzzle.

5. The system of example 4, wherein the barrel comprises a vent positioned forward of the electrically conductive components so that the vent vents an exhaust from the firearm.

6. The system of any of the examples 1-5, wherein the electrically conductive components are configured so that:
   the projectile exits the bore at a speed that can be stopped by hand, or the speed is less than 10 m/s, or
   the projectile has a kinetic energy reduced by at least 90% and at least a portion of the kinetic energy is converted to the energy comprising electrical energy.

7. The system of any of the examples 1-2 or 4-6, wherein the magnetic material comprises a permanent magnet.

8. The system of any of the examples 1-7, wherein the electrically conductive components each comprise a coil.

9. The system of any of the examples 1-8, wherein the electrically conductive components comprise a pick-up coil coupled to a magnet.

10. The system of any of the examples 1-9, further comprising a reactor coupled to the barrel, wherein the reactor is configured to:
    react a chemical propellant with a reactant so as to form an exhaust product, and
    direct the exhaust product to propel the projectile through the bore.

11. The system of example 10, wherein the reactor comprises a combustion chamber.

12. The system of example 11, wherein the projectile comprises a piston.

13. The system of example 12, further comprising a system for returning the piston to the reactor after the piston has traveled the length of the bore.

14. The system of any of the examples 1-13, wherein the circuit comprises one or more capacitors storing the energy generated from the electrical current.

15. The system of any of the examples 1-14, wherein the electrically conductive components are connected in parallel with the capacitors.

16. The system of any of the examples 1-15, further comprising:
    a battery connected to the circuit, wherein the battery stores the energy.

17. The system of example 16, wherein the energy is capable of powering a cell phone, a radio, a television, a computer, a global positioning system, an air conditioning system, or an electric vehicle motor.

18. The system of any of the examples 1-17, wherein the circuit comprises a buffer circuit:
    charging capacitors using the electrical current and with a first time constant commensurate with a timescale of the projectile traveling along the bore, and
    discharging the capacitors into the battery with a second time constant longer that the first time constant and commensurate with a charging time in accordance with the manufacturer specifications for the battery.

19. A vehicle comprising an road vehicle (e.g., car, truck, bus, or tank), an aircraft, or a watercraft (e.g., a boat) comprising the system of any of the examples 1-18.

20. The vehicle of example 19, further comprising an electromagnetic weapon powered using the apparatus.

The present disclosure further describes a method of operating a firearm, comprising:
  firing a firearm so as to propel a projectile from the firearm;
  converting a kinetic energy of the projectile into an electrical energy; and
  charging a battery using the electrical energy.

In one or more examples, the method further comprises providing the firearm comprising a barrel including a bore; providing a circuit including a plurality of electrically conductive components distributed along a length of the bore; and providing the projectile comprising at least one of a conductive material or a magnetic material magnetically coupled to the electrically conductive components when the projectile is moving along the length of the bore. The circuit stores energy generated from an electric current induced in the electrically conductive components when the projectile moving along the length of the bore causes a magnetic interaction between the electrically conductive components and the at least one of the magnetic material or the conductive material. The magnetic interaction causes braking of the projectile.

DESCRIPTION

In the following description, reference is made to the accompanying drawings which form a part hereof, and which is shown, by way of illustration, several examples. It is understood that other examples may be utilized and structural changes may be made without departing from the scope of the present disclosure.

Technical Description

The present disclosure describes a system that uses Faraday's law to rapidly and directly convert kinetic energy of a magnetized and/or conducting projectile (propelled by chemical energy) into usable electrical energy. In one example, the magnetic braking effect of an "inverse coil gun" removes energy from a high kinetic energy projectile (whose initial kinetic energy is generated from chemical energy) and produces a voltage in a circuit magnetically coupled to projectile. The electrical energy associated with the voltage is used directly by an application or to charge capacitors or batteries for later use. This system drastically reduces the weight of energy storage.

Firearm Example

Figure 1:
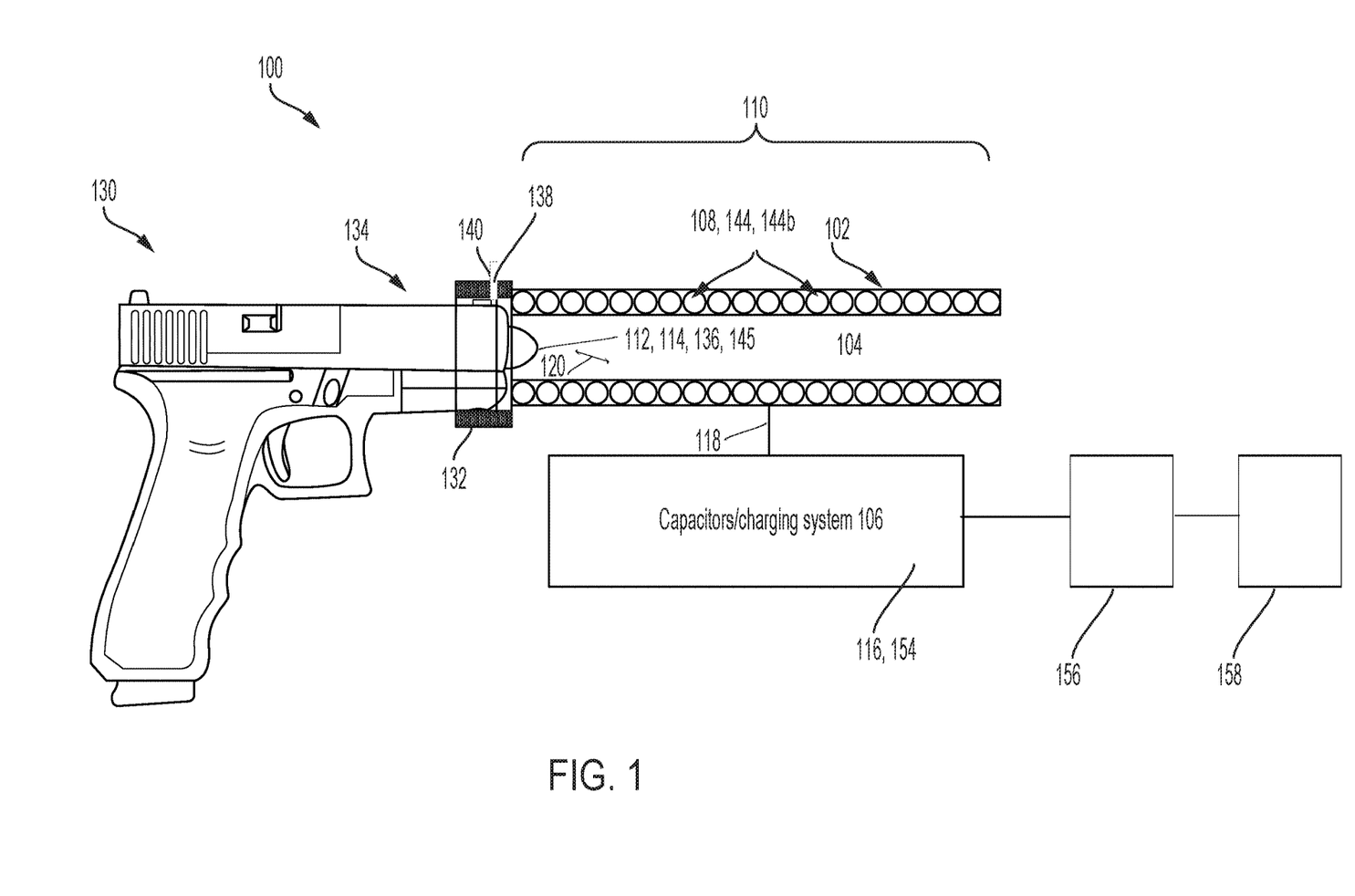
FIG. 1 illustrates a regenerative braking system according to a first example.

FIG. 1 illustrates a regenerative braking system 100 comprising a barrel 102 including a bore 104; a circuit 106 including a plurality of electrically conductive components 108 distributed along a length 110 of the bore 104; and a projectile 112 comprising a material 114 selected from at least one of a conductive material or a magnetic material magnetically coupled to the electrically conductive components 108 when the projectile 112 is moving along the length 110 of the bore 104. Example electrically conductive components 108 include, but are not limited to, coils 144 or pick up coils (144b) coupled to a magnet 147. Example magnetic materials include, but are not limited to, a permanent magnet 145.

The circuit 106 stores energy 116 generated from an electric current 118 induced in the electrically conductive components 108 when the projectile 112 moving along the length 110 of the bore 104 causes a magnetic interaction 120 between the electrically conductive components 108 and the material 114. The magnetic interaction 120 also causes braking or slowing of the projectile 112. In one or more examples, the circuit 106 comprises (or is connected to) capacitors 154 and/or batteries 156 used to store the energy 116 for powering an appliance or other device 158.

In the example illustrated in FIG. 1, the system is an attachment that can be removably attached to, or retrofitted on, a firearm 130. A connector 132 is used to attach the barrel 102 to the muzzle 134 of the firearm 130 so that the projectile 112 (a bullet 136) is fired into the barrel 102 from the muzzle 134. The barrel 102 or the connector 132 comprises a vent 138 positioned forward of the electrically conductive components 108, so that the vent 138 vents an exhaust 140 from the firearm 130.

Piston Example

Figure 2:
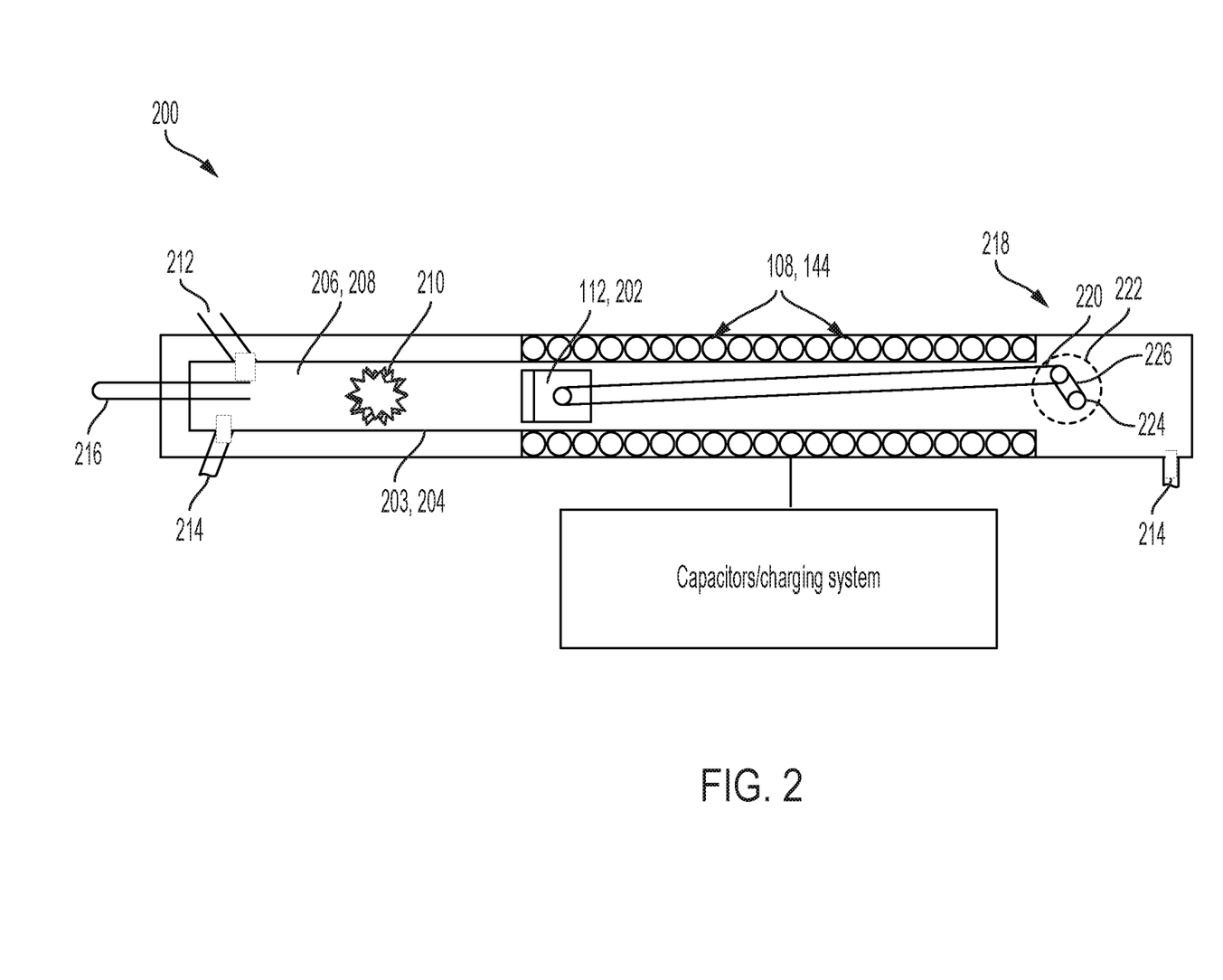
FIG. 2 illustrates a regenerative braking system according to a second example.

FIG. 2 illustrates an example regenerative braking system 200 wherein the projectile 112 comprises a piston 202. The system further includes a reactor 204 (e.g., combustion chamber 203) coupled to the barrel 102 and the reactor 204 is configured to (1) react a chemical propellant 206 with a reactant 208 (e.g., air or oxygen) so as to form an exhaust product 210, and (2) direct the exhaust product 210 to propel the piston 202 through the bore 104. The reactor 204 comprises an intake 212 for inputting air, an exhaust 214 for outputting exhaust product 210, and a spark plug 216 for igniting the chemical propellant 206. The regenerative braking system 200 further comprises a mechanism 218 for returning the piston 202 to the reactor 204 after the piston 202 has traveled the length 110 of the bore 104 following propulsion and braking. In the illustrated example, the mechanism 218 comprises a connecting rod 220, a crank 222, a crank pin 224, and a crank shaft 226, wherein a portion of the reciprocating motion of the piston 202 is converted to rotational motion of the crank 222 which is then used to push the connecting rod 220 that drives the piston back to the reactor 204.

Example Magnetic Field Distributions

Figure 3:
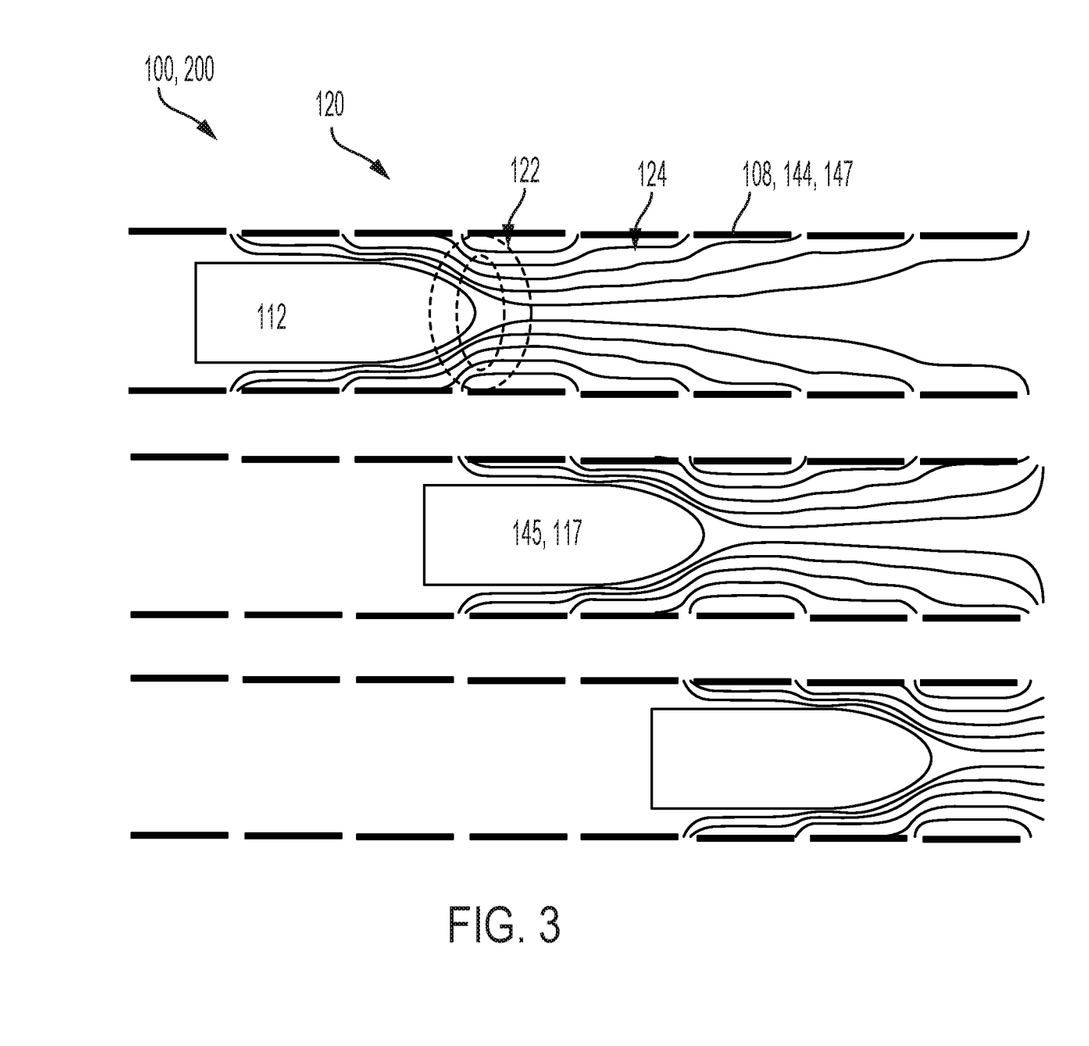
FIG. 3 illustrates an example magnetic field distribution in a regenerative braking system according to one or more examples described herein.

FIG. 3 illustrates various example magnetic interactions 120 between the electrically conductive components 108 and the projectile 112. In one implementation, the projectile 112 generates a first magnetic field 122 configured to induce the electric current 118 in the electrically conductive components 108 when the projectile 112 is moving along the length 110 of the bore 104. The electric current 118 generates a second magnetic field 124 and the electrically conductive components 108 are configured so that the magnetic interaction 120 of the second magnetic field 124 with the first magnetic field 122 causes the braking of the projectile 112, e.g., as the kinetic energy 117 of the projectile 112 is converted to electrical energy 116. In various examples, the second magnetic field 124 does not extend behind the projectile 112 so as to prevent pushing of the projectile 112 along the bore 104.

In another implementation wherein the projectile 112 comprises a conductive material, the the magnetic interaction 120 induces an eddy current in the conductive material in the projectile 112 moving along the length 110 of the bore 104. The formation of the eddy current causes the braking of the projectile as kinetic energy 117 of the projectile is dissipated in the eddy current.

Application Examples

Figure 4:
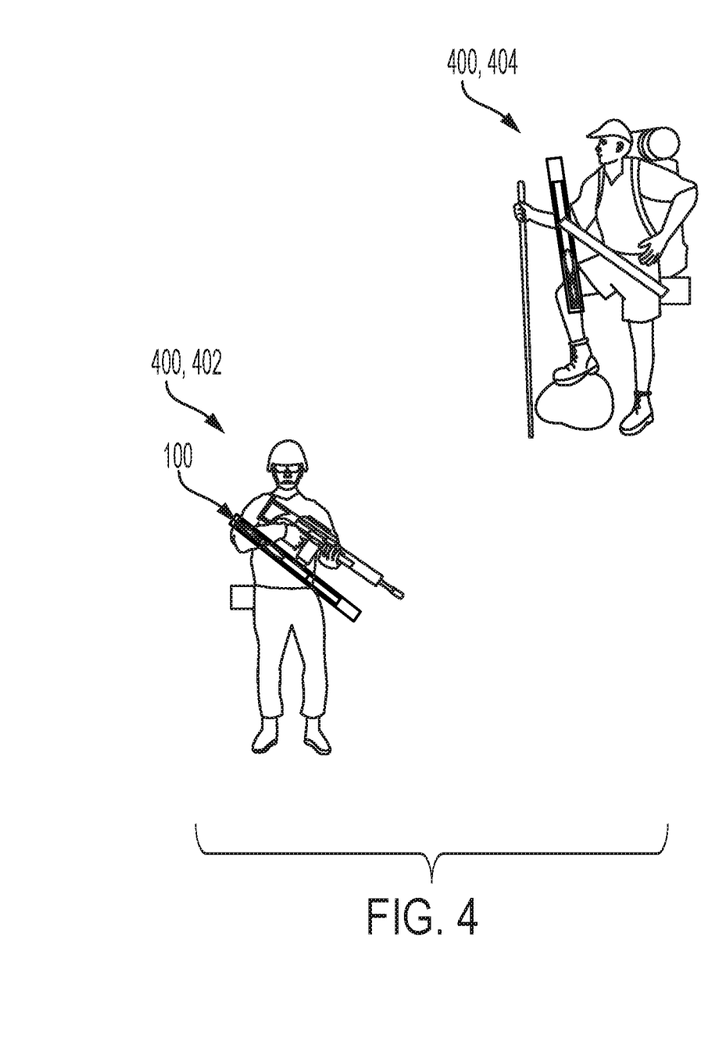
FIG. 4 illustrates a soldier or hiker using a regenerative braking system in a field application, according to one or more examples described herein.

FIG. 4 illustrates a human 400 (e.g., a soldier 402 or a hiker 404) operating the regenerative braking system 100 comprising a hand held or portable device. The hand held device is used to charge a battery for small scale power generation out in the field. In one or more examples, the electrically conductive components 108 are configured so that the braking causes the projectile 112 to exit the bore at a speed of less than 10 m/s, at a speed that can be stopped by an unprotected hand or a protected hand (e.g., a hand protected with armor or a glove). In one or more further examples, the projectile has a kinetic energy reduced by at least 90%-99% and at least a portion of the kinetic energy is converted to the energy 116 comprising electrical energy. The average energy in a moving 50 caliber rifle cartridge is approximately 50 kJ, which is more than sufficient to charge an alkaline AA battery (~10 kJ energy storage capacity), a C battery (~35 kJ energy storage capacity), a NiCad battery (~⅓ of these energies) or a NiMH battery (~½ of these energies). Multiple firings or larger caliber cartridges can be used to charge an alkaline D-battery (~75 kJ energy storage capacity).

In one or more examples, the energy 116 is capable of powering at least one appliance or device 158 selected from a cell phone, a radio, a television, a computer, a global positioning system, an air conditioning system, or an electric vehicle motor (electric motor).

Figure 5:
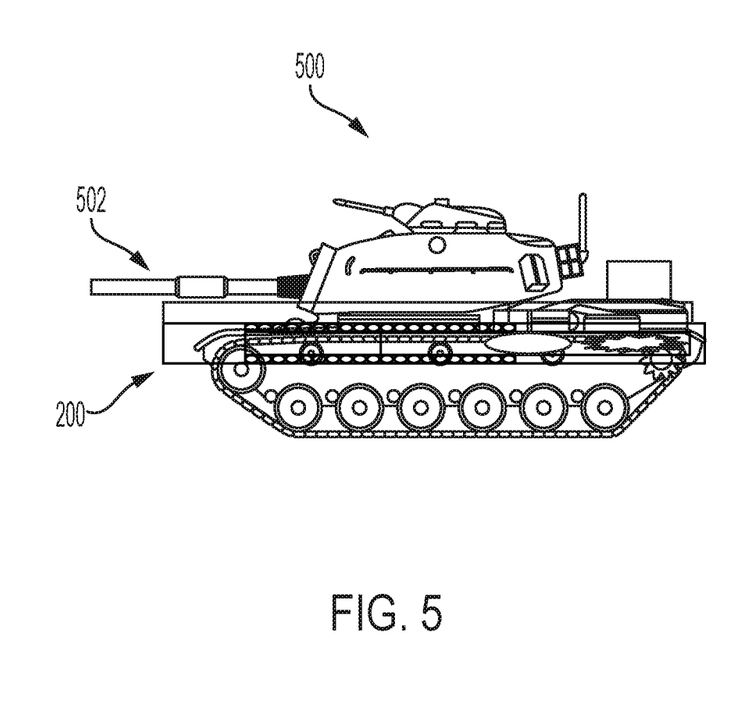
FIG. 5 illustrates a vehicle including a regenerative braking system according to one or more examples described herein.

FIG. 5 illustrates a vehicle 500 (a tank) comprising the regenerative braking system 200 illustrated in FIG. 2. The vehicle further comprises an electromagnetic weapon 502 and the regenerative braking system 200 is used for rapid charging of the energy system for the electromagnetic weapon 502. Although a tank is illustrated, in other examples the regenerative braking system 200 is mounted on an aircraft or watercraft (e.g., boat) near a naval or aircraft gun for rapid charging of the naval gun or the aircraft gun, respectively. A fired M1 Abrams tank shell has an energy of ~30 MJ which is sufficient to charge multiple batteries or a hybrid car battery (~5.4 MJ storage capacity). Other example vehicles include, but are not limited to, a car, a truck, a jeep, or a bus.

TABLE 1

Various energy capacities for standard batteries and kinetic energies of various caliber bullets that could be used to charge these batteries, wherein bullets are referred in with their NATO nomenclature..

|  | energy (J) | weight (g) | J/g | Rechargeable |
|---|---|---|---|---|
| battery |  |  |  |  |
| AA Alkaline | 9360 | 24 | 390.0 | No |
| AA Li-Ion | 11050 | 24 | 460.4 | No |
| AA NiCd | 4320 | 29 | 149.0 | Yes |
| AA NiMH | 9072 | 26 | 348.9 | Yes |
| D Alkaline | 74970 | 135 | 555.3 | No |
| D NiCd | 21600 | 200 | 108.0 | Yes |
| D NiMH | 41040 | 170 | 241.4 | Yes |

TABLE 1-continued

Various energy capacities for standard batteries and kinetic energies of various caliber bullets that could be used to charge these batteries, wherein bullets are referred in with their NATO nomenclature..

|  | energy (J) | weight (g) | J/g | Rechargeable |
|---|---|---|---|---|
| bullet |  |  |  |  |
| 5.56 × 45 | 1796 | 11.9 | 150.9 |  |
| 7.62 × 51 | 3304 | 25.5 | 129.6 |  |
| 7.62 × 39 | 2108 | 18.2 | 115.8 |  |
| 9 × 19 | 570 | 8 | 71.3 |  |
| .50 BMG | 18100 | 120 | 150.8 |  |

Process Steps
Method of Manufacturing

Figure 6:
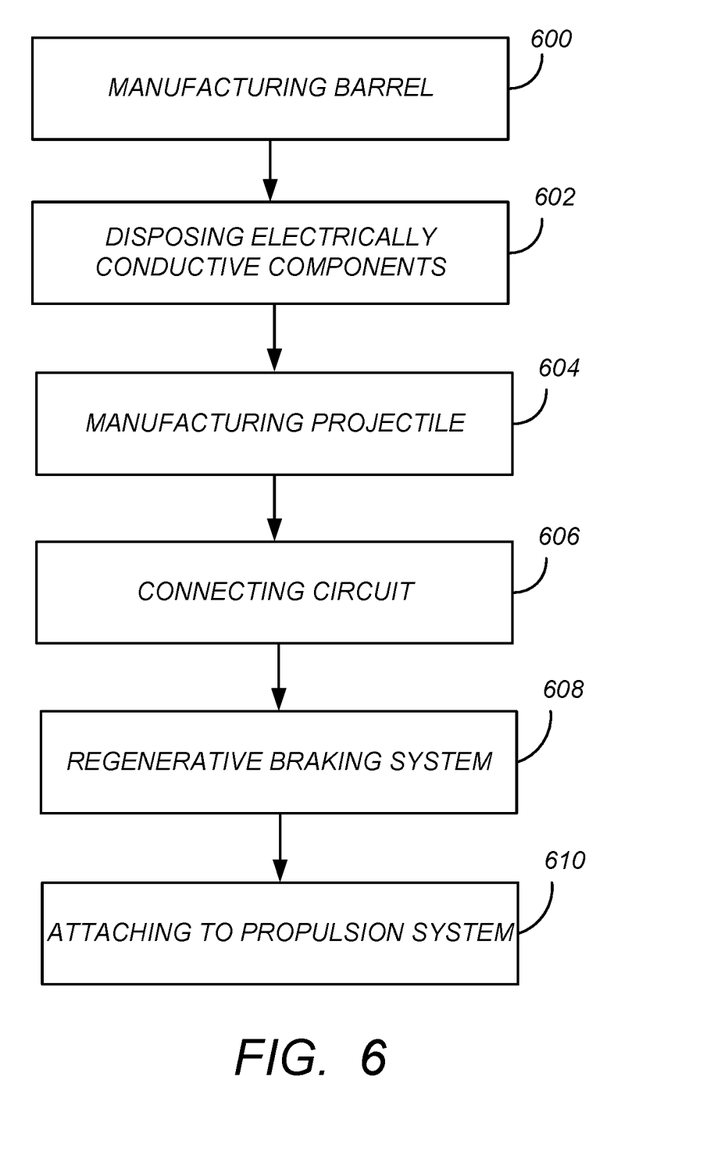
FIG. 6 is a flowchart illustrating a method of making a regenerative braking system according to one or more examples described herein.

FIG. 6 illustrates a method of making a regenerative braking system (referring also to FIG. 1 and FIG. 2).

Block 600 represents obtaining or manufacturing a barrel 102 comprising a bore 104. In one or more examples, the barrel and bore are manufactured using materials typically used for the manufacturing of firearms (e.g., metal). Example barrels and bores include, but are not limited to, bores and barrels having a cylindrical cross-section or a non-cylindrical cross-section.

Block 602 represents disposing or distributing a plurality of electrically conductive components 108 along a length 110 of the bore 104. Example electrically conductive components include, but are not limited to, coils 144 (comprising wire), windings (comprising wire), or pick up coils (comprising wire) coupled to a magnet. In one example, the electrically conductive components comprise a linear set of coils disposed linearly along the length of the bore. Example materials for the electrically conductive components include materials typically used for the manufacture of conductive coils and windings, e.g., wires comprising metal (e.g., silver, copper, tungsten, etc.). Example materials for the magnet include, but are not limited to, rare earth materials (e.g., neodymium).

Block 604 represents obtaining or manufacturing a projectile 112 comprising at least one material 114 selected from a conductive material or a magnetic material that can be magnetically coupled to the electrically conductive components when the projectile is moving along the length of the bore. Example magnetic materials include a permanent magnet comprising, for example rare earth materials (e.g., neodymium). Example materials for the conductive material include materials typically used for the manufacture of conductive coils, windings, loops, or wires, e.g., metal such as, but not limited to, silver, copper, tungsten, etc.

Block 606 represents connecting a circuit including the electrically conductive components. The circuit 106 is configured to store energy 116 generated from an electric current 118 induced in the electrically conductive components when the projectile moving along the length of the bore causes a magnetic interaction 120 between the electrically conductive components and the material. In one or more examples, the circuit 106 comprises (or is connected to) capacitors 154 and/or batteries 156 used to store the energy 116.

In one or more examples, the circuit 106 comprises a buffer circuit:

charging capacitors 154 using the electrical current 118 and with a first time constant commensurate with a timescale of the projectile 112 traveling along the bore 104, and discharging the capacitors 154 into the battery 156 with a second time constant longer that the first time constant and commensurate with a charging time in accordance with the battery manufacturer's specifications.

Block 608 represents the end result, a regenerative braking system as illustrated in FIG. 1 or FIG. 2.

Block 610 represents attaching the regenerative braking system to a firearm, reactor, or other system for propelling the projectile along the bore. Examples of firearm include, but are not limited to, a gun, pistol, assault weapon, or machine gun. Examples of reactor include, but are not limited to, a combustion chamber as used in a combustion engine.

Method of Operation

Figure 7:
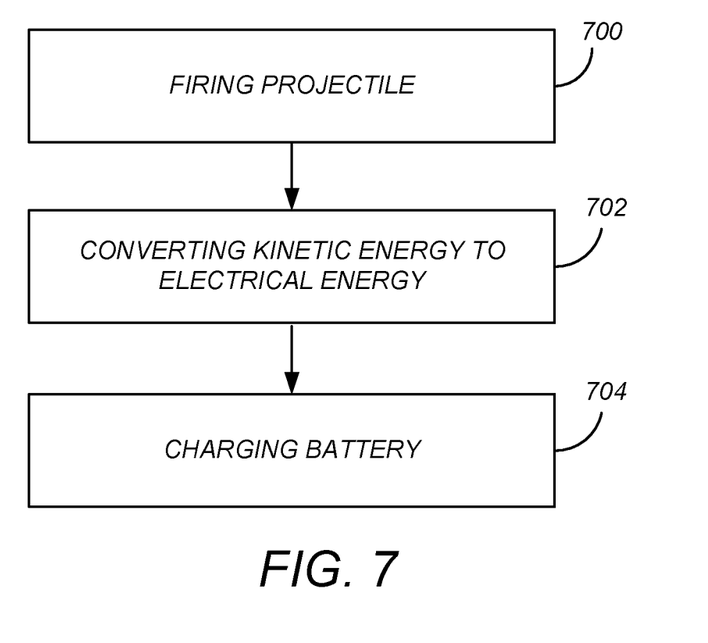
FIG. 7 is a flowchart illustrating a method of using a regenerative braking system, according to one or more examples described herein.

FIG. 7 illustrates a method of operating a firearm.

Block 700 represents firing a firearm so as to propel a projectile from the firearm.

Block 702 a represents converting a kinetic energy of the projectile into an electrical energy.

Block 704 represents charging a battery using the electrical energy.

This method solves the problem of charging weaponry or other devices in the field. Specifically, the method is able to rapidly convert high-density chemical energy into usable electrical energy using direct energy conversion, reducing weight of energy storage compared to state-of-the-art batteries.

Existing solutions generally involve carrying multiple charged replacement batteries. However, batteries are heavy with relatively low energy density compared to chemical energy solutions. Moreover, batteries slowly lose energy and need frequent recharging, which requires a recharging power supply and energy source. Embodiments of the methods described herein require that only one battery is transported in the field since the energy is stored in the chemical energy of the propellant used to fire the projectile and the chemical energy is only converted to electrical energy when needed to recharge the battery.

CONCLUSION

This concludes the description of the examples of the present disclosure. The foregoing description of the examples has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A system, comprising:
a regenerative braking system, comprising:
a barrel comprising a bore;
a circuit including a plurality of electrically conductive components distributed along a length of the bore; and
a projectile comprising at least one of a conductive material or a magnetic material magnetically coupled to the electrically conductive components when the projectile is moving along the length of the bore; and
a connector configured to attach the barrel to a muzzle of a firearm,
wherein:
the projectile comprising a bullet is fired into the barrel from the muzzle,
the circuit stores electrical energy generated from an electric current induced in the electrically conductive components when the projectile moving along the length of the bore causes a magnetic interaction between the electrically conductive components and the magnetic material or the conductive material,
the magnetic interaction causes braking of the projectile,
the circuit stores the energy capable of charging a battery connected to the circuit and the energy is capable of powering at least one device selected from a cell phone, a radio, a television, a computer, an air conditioning system, or an electric vehicle motor, and
the electrically conductive components are configured so that the projectile at least:
has a speed less than 10 m/s, or
has a kinetic energy reduced by at least 90% and at least a portion of the kinetic energy is converted to the electrical energy.

2. The system of claim 1, wherein:
the projectile generates a first magnetic field configured to induce the electric current in the electrically conductive components when the projectile is moving along the length of the bore, and
the electric current generates a second magnetic field and the electrically conductive components are configured so that the magnetic interaction of the second magnetic field with the first magnetic field causes the braking of the projectile.

3. The system of claim 1, wherein the magnetic interaction induces an eddy current in the conductive material in the projectile moving along the length of the bore.

4. The system of claim 1, wherein:
the barrel comprises a vent positioned forward of the electrical conductive components, wherein the vent vents an exhaust from the firearm.

5. The system of claim 1, wherein the projectile comprises at least one of a conductive material or a magnetic material comprising a permanent magnet and the electrically conductive components each comprise a coil.

6. The system of claim 1, wherein the electrically conductive components comprise a pick-up coil coupled to a magnet.

7. The system of claim 1, further comprising a reactor coupled to the barrel, wherein the reactor is configured to:
react a chemical propellant with a reactant so as to form an exhaust product, and
direct the exhaust product to propel the projectile into the bore.

8. The system of claim 7, wherein the reactor comprises a combustion chamber and the projectile comprises a piston.

9. The system of claim 8, further comprising a mechanism for returning the piston to the reactor after the piston has traveled the length of the bore.

10. The system of claim 1, wherein the circuit comprises one or more capacitors storing the energy generated from the electrical current.

11. The system of claim 10, wherein the electrically conductive components are connected in parallel with the capacitors.

12. The system of claim 1, further comprising: the battery connected to the circuit, wherein the battery stores the energy.

13. The system of claim 12, wherein the energy is capable of powering
a global positioning system.

14. The system of claim 12, wherein the circuit comprises a buffer circuit:

charging capacitors using the electrical current and with a first time constant commensurate with a timescale of the projectile traveling along the bore, and discharging the capacitors into the battery with a second time constant longer that the first time constant and commensurate with a charging time in accordance with the battery manufacture specifications.

15. A vehicle, aircraft, or watercraft comprising the system of claim 1.

16. A method of making a regenerative braking system, comprising:

providing a firearm comprising a barrel including a bore;

providing a circuit including a plurality of electrically conductive components distributed along a length of the bore; and providing a projectile comprising at least one of a conductive material or a magnetic material magnetically coupled to the electrically conductive components when the projectile is moving along the length of the bore; wherein converting comprises:

the circuit storing energy generated from an electric current induced in the electrically conductive components when the projectile moving along the length of the bore causes a magnetic interaction between the electrically conductive components and the magnetic material or the conductive material, the magnetic interaction causes braking of the projectile; and the circuit stores electrical energy capable of charging a battery connected to the circuit and the energy, and the electrically conductive components are configured so that the projectile at least:

has a speed less than 10 m/s, or has a kinetic energy reduced by at least 90% and at least a portion of the kinetic energy converted to the electrical energy.

17. A method of operating the firearm of claim 16, comprising:

firing the firearm so as to propel a projectile from the firearm;

converting a kinetic energy of the projectile into an electrical energy; and charging a battery using the electrical energy.

18. A system, comprising:

a regenerative braking system, comprising:

a firearm comprising a barrel comprising a bore;

a circuit including a plurality of electrically conductive components distributed along a length of the bore; and a projectile comprising at least one of a conductive material or a magnetic material magnetically coupled to the electrically conductive components when the projectile is moving along the length of the bore; and wherein:

the circuit stores electrical energy generated from an electric current induced in the electrically conductive components when the projectile moving along the length of the bore causes a magnetic interaction between the electrically conductive components and the magnetic material or the conductive material, the magnetic interaction causes braking of the projectile, the electrically conductive components are configured so that the projectile at least:

has a speed less than 10 m/s, or has a kinetic energy reduced by at least 90% and at least a portion of the kinetic energy converted to the electrical energy.

19. The system of claim 18, further comprising a battery connected to the circuit, wherein the battery stores the energy.

20. The system of claim 18, further comprising a connector configured to attach the barrel to a muzzle of the firearm, wherein the projectile comprising a bullet is fired into the barrel from the muzzle.

\* \* \* \* \*

UNITED STATES PATENT AND TRADEMARK OFFICE
CERTIFICATE OF CORRECTION

PATENT NO. : 11,817,713 B2
APPLICATION NO. : 16/825045
DATED : November 14, 2023
INVENTOR(S) : James A Grossnickle It is certified that error appears in the above-identified patent and that said Letters Patent is hereby corrected as shown below:

In the Claims

Column 8, Line 1, in Claim 1, delete the text "electrical".

Column 8, Line 18, in Claim 1, insert the text --energy in a form of-- before "electrical energy".

Column 8, Line 34, in Claim 4, the text "electrical" should be changed to --electrically--.

Column 8, Line 34, in Claim 4, replace the text "wherein" with the text --and--.

Column 8, Line 37, in Claim 5, the text "a conductive material or a magnetic material" should be replaced with the text --the conductive material or the magnetic material--.

Column 8, Line 56, in Claim 10, the text "electrical" should be changed to the text --electric--.

Column 9, Line 5, in Claim 14, the text "that" should be changed to the text --than--.

Column 9, Line 7, in Claim 14, the text "the battery manufacturer specifications" should be changed to the text --battery manufacturer specifications of the battery--.

Column 9, Line 19, in Claim 16, the text "the length" should be changed to the text --a length--.

Column 9, Line 20, in Claim 16, delete the text "converting comprises:".

Column 9, Line 21, in Claim 16, the text "storing" should be changed to the text --stores--.

Column 9, Line 27, in Claim 16, the text ";" should be changed to the text --,--.

Column 9, Line 28, in Claim 16, delete the text "and".

Signed and Sealed this
Fourth Day of March, 2025

Coke Morgan Stewart
*Acting Director of the United States Patent and Trademark Office*

CERTIFICATE OF CORRECTION (continued)
U.S. Pat. No. 11,817,713 B2

Column 9, Line 29, in Claim 16, the text "electrical" should be changed to the text --the--.

Column 9, Line 30, in Claim 16, delete the text "the energy, and".

Column 9, Line 35, in Claim 16, insert the text --energy in a form of-- before "electrical energy".

Column 10, Line 1, in Claim 17, the text "a projectile" should be changed to the text --the projectile--.

Column 10, Line 3, in Claim 17, the text "a kinetic energy" should be changed to the text --the kinetic energy--.

Column 10, Line 3, in Claim 17, the text "an" should be changed to the text --the--.

Column 10, Line 5, in Claim 17, the text "a battery" should be changed to the text --the battery--.

Column 10, Line 15, in Claim 18, the text "the length" should be changed to the text --a length--.

Column 10, Line 17, in Claim 18, delete the text "electrical".

Column 10, Line 28, in Claim 18, insert the text --energy in a form of-- before "electrical energy".